United States Patent [19]

McLean

[11] 4,265,712
[45] May 5, 1981

[54] WATER PURIFICATION SYSTEM

[76] Inventor: Peter J. McLean, 367 Askin Blvd., Windsor, Ontario, Canada, N9B 2X1

[21] Appl. No.: 19,176

[22] Filed: Mar. 9, 1979

[51] Int. Cl.³ .............................................. C02F 1/04
[52] U.S. Cl. .................................. 202/166; 202/177; 202/181; 202/235; 203/10; 203/21; 203/DIG. 16; 122/14; 126/350 R
[58] Field of Search ............ 203/10, 11, 21, DIG. 16, 203/DIG. 17; 202/166, 167, 234, 235, 181, 180, 177, 202; 126/376, 377, 383, 350 R; 122/14

[56] References Cited

U.S. PATENT DOCUMENTS

| | | | |
|---|---|---|---|
| 797,843 | 8/1905 | Daley | 202/166 |
| 1,219,413 | 3/1917 | Donk | 202/177 |
| 2,226,828 | 12/1940 | Moran | 202/177 |
| 3,380,895 | 4/1968 | Loebel | 202/166 |
| 4,035,240 | 7/1977 | McLean | 202/167 |

Primary Examiner—Wilbur L. Bascomb, Jr.
Attorney, Agent, or Firm—Whittemore, Hulbert & Belknap

[57] ABSTRACT

A water purification system for use in combination with a domestic hot water heating tank. The system includes a water container for containing water separate from the water in the tank. A conduit carries hot water from the tank to the container, passing in close proximity to the heating unit of the hot water tank. A duct leading from the container conveys water vapor formed in the container to a receptacle. The water in the receptacle having been evaporated and condensed is thus purified for domestic use.

1 Claim, 2 Drawing Figures

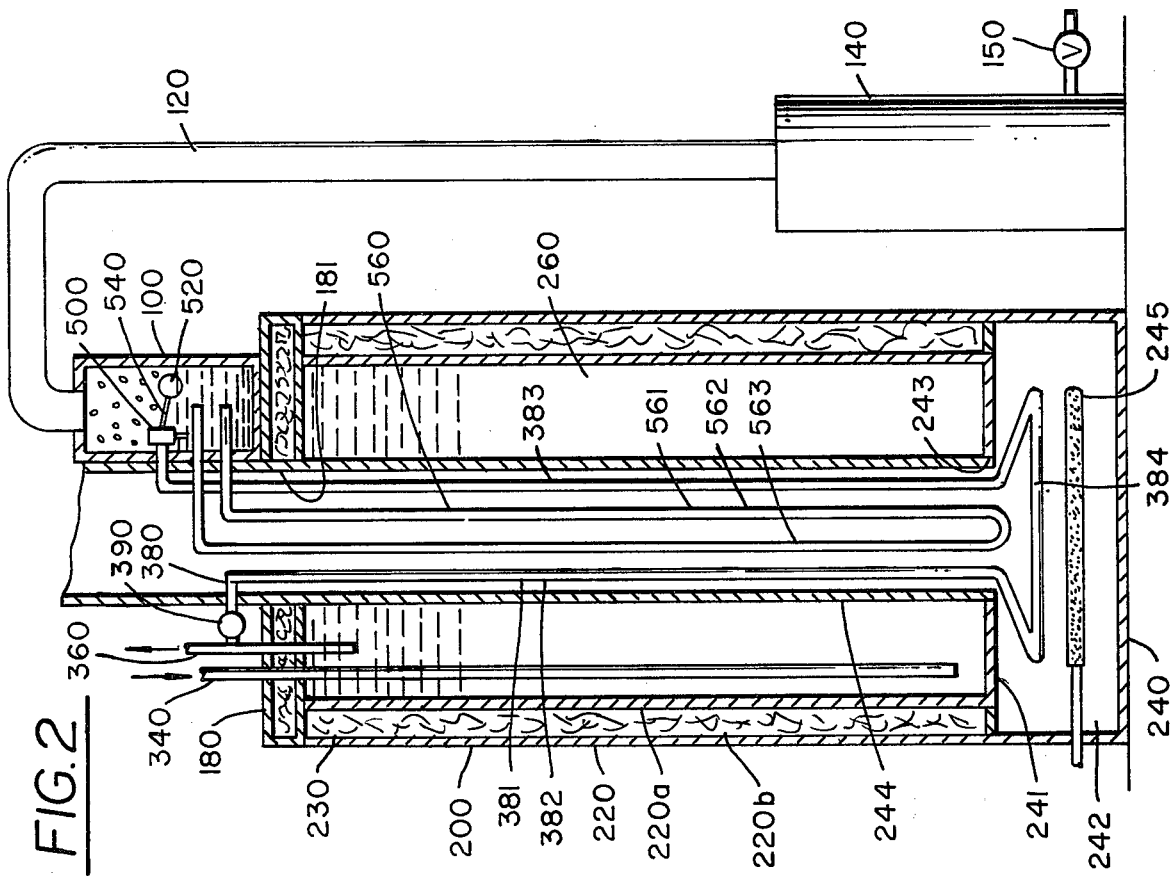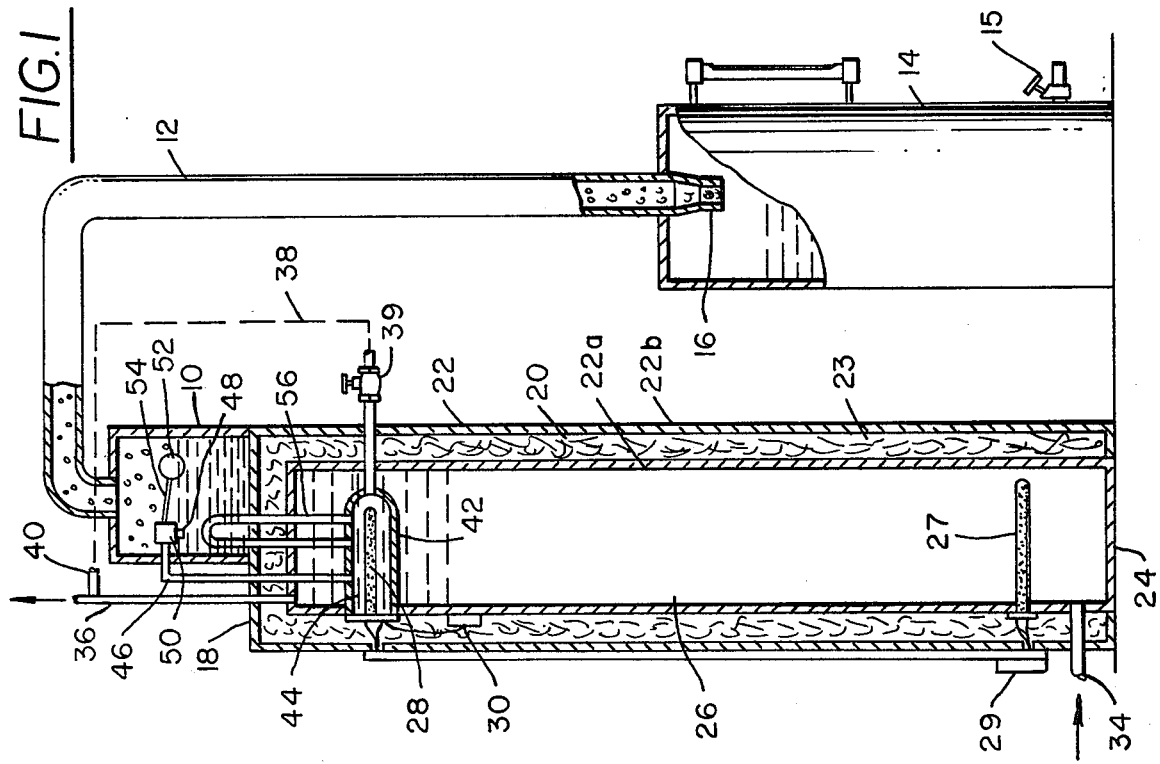

WATER PURIFICATION SYSTEM

This invention relates to a water purification system for use in combination with a domestic hot water heater.

SUMMARY OF THE INVENTION

This invention is in some respects an improvement on the invention described in my U.S. Pat. No. 4,035,240 issued on July 12, 1977.

The general object of the invention is to take ordinary tap water and purify it by removing objectionable minerals and other impurities, thereby rendering it more palatable for drinking purposes, cooking, making tea, coffee, ice cubes, etc. The purified water obviously may also be used for such purposes as watering plants and washing clothes.

The apparatus of the invention comprises a container which may be mounted atop an ordinary upright domestic hot water tank and supplied with hot water by a conduit from the tank. The conduit passes in close proximity to the heating unit for the tank to further heat the water transferred to the container.

A duct leads from the container to carry away water vapor as it forms. The water vapor condenses in the duct and discharges into a receptacle ready for use.

A ready supply of condensed and purified water is thus made available in the receptacle at all times.

BRIEF DESCRIPTION OF THE DRAWING

FIG. 1 is a vertical sectional view of apparatus embodying my invention shown in association with a conventional domestic hot water tank heated by an electric heating element or elements.

FIG. 2 is a vertical sectional view of apparatus embodying my invention shown in association with a conventional domestic hot water tank heated by a gas burner.

DETAILED DESCRIPTION

Referring now more particularly to the drawing and especially to FIG. 1, the water purification apparatus will be seen to comprise a water container 10, a conduit 12 leading from the container, and a receptacle 14 for receiving condensate from the discharge end 16 of the duct. A tap 15 on the receptacle may be used to draw purified water therefrom. The container is shown mounted on the top wall 18 of an upright hot water tank 20.

The tank 20 may be a conventional hot water tank of the domestic type. It is shown as being generally in the form of an upright cylinder having a cylindrical wall 22 which may consist of inner and outer panels or shells 22a and 22b provided with insulation 23 in the space between the shells. The top wall 18 is likewise shown as being formed of spaced panels with insulation in the space therebetween. The cylindrical wall 22, top wall 18 and the bottom wall 24 together define a chamber 26 in which water is held in the tank and heated, in the present instance by electric heating elements 27 and 28. These heating elements are controlled by a thermostat 30 to maintain the temperature of water in the tank at any desired temperature that may be set by a suitable control 29 on the side of the tank, suitable electrical wiring connecting the control 29, thermostat 30 and heating elements 27 and 28.

The reference numeral 34 indicates a cold water inlet pipe to the tank and the reference numeral 36 indicates an outlet pipe for conveying hot water from the tank to various water outlets in the house.

Water in the tank is conveyed to the container 10 by a conduit 38 which includes a section 40 from the hot water pipe 36 to the enlarged section 42 within the tank chamber 26 which surrounds the heating element 28 and forms a water chamber 44 in which the heating element 28 is disposed. The conduit 38 also includes a section 46 from the chamber 44 to the container 10, terminating in a water outlet 48. Suitable sealed openings in the walls of the tank 20 and container 10 are provided, through which the conduit sections 40 and 46 pass. The conduit 38 may, if desired, have a manual shut-off valve 39.

A float-controlled valve 50 is provided in the conduit section 46 which when open allows hot water from pipe 36 to flow through conduit 38 into the container 10. A float 52 within the container is connected to valve 50 by a pivoted arm 54. The arrangement is such that as the level of water in the container rises to the predetermined level indicated in FIG. 1, the valve 50 is closed to prevent any more water from entering the container. As the water level in container 10 drops, the float 52 drops, opening valve 50 to allow hot water to enter through conduit 38 up to the predetermined level. The valve 50 may be of any suitable construction, such for example as that shown in my patent identified hereinabove.

A water circulation pipe 56 is provided, the ends of which communicate with the chamber 44 in section 42 of conduit 38, and an intermediate portion of which passes through sealed openings in the top wall of the tank and are disposed within the body of water in container 10.

In use, hot water from the hot water pipe 36 is under the usual 5 to 10 psi pressure of a municipal water system and will fill the container 10 to the level indicated in FIG. 1 by way of conduit 38. The water thus transmitted through conduit 38 to container 10 is further heated by reason of the fact that it passes through chamber 44, in which heating element 28 is disposed, on its way to the container 10. The water in container 10 is further heated by the circulation of water in pipe 56 from the chamber 44.

Vapor forms in the container 10 by reason of the high temperature of the water in the container, which vapor then rises in duct 12, condenses and is discharged into the receptacle 14 where it is ready for use.

A modification of the invention is shown in FIG. 2 in which the hot water tank is heated by gas instead of electricity. The water purification apparatus comprises a water container 100, a duct 120 leading from the container and a receptacle 140 for receiving condensate from the discharge end of the duct. A tap 150 on the receptacle may be used to draw off purified water. The container is shown mounted on the top wall 180 of the upright hot water tank 200.

As with the embodiment previously described, the tank 200 may be of a conventional hot water tank of the domestic type. As shown, it is generally in the form of an upright cylinder having a cylindrical wall 220 which may consist of inner and outer panels or shells 220a and 220b provided with insulation 230 in the space between the shells. The top wall 180 is likewise shown as being formed of spaced panels with insulation in the space therebetween and with a central opening 181. The tank has a bottom wall 240 and a lower wall 241 spaced above the bottom wall to provide a gas burner chamber 242. The wall 241 has a central opening 243. A vertical vent or exhaust pipe 244 extends from the bottom wall 241 upwards through the top wall 180 for connection to a suitable outlet for the discharge of the products of combustion from gas burner 245 located in chamber 242.

The cylindrical wall 220, top wall 180, bottom wall 241 and central vent pipe 244 define an annular chamber 260 in which water is held in the tank and heated by the gas burner 245. Suitable thermostatic controls, not shown, may be provided for turning the gas burner on and off to maintain the desired temperature of water within the tank.

The reference numeral 340 indicates a cold water inlet pipe to the tank and the reference numeral 360 indicates an outlet pipe for conveying hot water from the tank to various water outlets in the house.

Water in the tank is conveyed to the container 100 by a conduit 380 which connects into the hot water pipe 360 above the tank. The conduit 380 has a U-shaped portion 381 composed of vertical sections 382 and 383 which are disposed lengthwise within the vent passage 244. These vertical sections 382 and 383 extend from above the top wall 180 of the tank to a point beneath the lower wall 241 and are joined at their lower ends by a connecting section 384 disposed closely above the gas burner. Preferably the connecting portion 384 follows generally the contour of the burner so that if the burner is circular when viewed from above, the connecting portion 384 will have a similar configuration and directly overlie the burner. On the other hand, if the burner is made up of parallel rows or manifold pipes with gas jets, the connecting portion 34 may likewise be composed of parallel rows of pipes respectively directly overlying the manifold pipes of the burner. In this way, a direct and substantial heating of the water in the pipe section 384 is accomplished. Also, of course, the vertical pipe sections 382 and 383 are heated by the hot gases passing upwards through the vent pipe 244.

The upper end of the conduit section 383 discharges into the container 100. It will be understood that suitable sealed openings in the walls of the vent pipe 244 and of the container 100 are provided through which the conduit 380 passes. Also, the conduit 380 may have a manual shut-off valve 390.

A float-controlled valve 500 is provided in the conduit 380 which when open allows hot water from pipe 360 to flow through conduit 380 into the container 100. A float 520 within the container is connected to valve 500 by a pivoted arm 540. The arrangement is the same as in the embodiment first described so that as the water in the container rises to the predetermined level indicated in FIG. 2, the valve 500 is closed to prevent any more water from entering the container. As the water level drops, the float 520 drops, opening valve 500 to allow hot water to enter through conduit 380. The valve may be of the same construction as that described in connection with FIG. 1.

A water circulation pipe 560 is provided, the ends of which communicate with container 100. The ends of the pipe 560 extend into a U-shaped portion 561 composed of vertical sections 562 and 563 which are disposed lengthwise within the passage in the vent pipe 244. The U-shaped portion 561 of the water circulation pipe thus extends from a level above the top wall 180 of the tank down to and even below the level of the bottom wall 241 to be heated not only directly by the burner 245, which is closely beneath the connecting portion of the vertical sections, but also to be heated continuously by the hot products of combustion passing upwards through the vent pipe.

In use, hot water from the hot water pipe 360 will fill the container 100 to the level indicated in FIG. 2 by way of conduit 380. The water thus transmitted through conduit 380 to container 110 is further heated by reason of the fact that it passes through the vertical conduit sections 382 and 383 disposed in the hot vent pipe 244 and also by reason of the fact that the connecting portion 384 is disposed closely above the burner 245 to be directly heated thereby. The water in container 100 is further heated by the circulation of water in pipe 560.

As in the case of the embodiment first described, water vapor forming in the container 100 will rise in duct 120, condense and be discharged into the receptacle 140 for use.

I claim:

1. The combination with an upright domestic hot water tank having a gas burner adjacent the bottom of said tank for heating water in said tank, of a water container for containing water separate from the water in said tank, means providing a vertical passage extending generally centrally through said tank for the exhaust of gaseous products of combustion of said gas burner, a conduit to carry hot water from said tank to said container, said conduit having a U-shaped portion composed of vertical sections disposed lengthwise within said passage joined at their lower ends by a connecting portion spaced closely above said gas burner to be heated thereby, a valve for said conduit, a collection receptacle for condensed water, and a duct leading from said container to convey water vapor formed in said container to said receptacle.

* * * * *